US012684029B2

(12) United States Patent
Trammell

(10) Patent No.: US 12,684,029 B2
(45) Date of Patent: *Jul. 14, 2026

(54) LOCATION-BASED PLAYLIST GENERATION

(71) Applicant: Sonos, Inc., Goleta, CA (US)

(72) Inventor: Mark Trammell, Santa Barbara, CA (US)

(73) Assignee: Sonos, Inc., Santa Barbara, CA (US)

( * ) Notice: Subject to any disclaimer, the term of this patent is extended or adjusted under 35 U.S.C. 154(b) by 25 days.

This patent is subject to a terminal disclaimer.

(21) Appl. No.: 18/799,613

(22) Filed: Aug. 9, 2024

(65) Prior Publication Data

US 2025/0047732 A1 Feb. 6, 2025

Related U.S. Application Data

(63) Continuation of application No. 18/338,887, filed on Jun. 21, 2023, now Pat. No. 12,063,261, which is a (Continued)

(51) Int. Cl.
*H04L 65/612* (2022.01)
*G06F 3/16* (2006.01)
(Continued)

(52) U.S. Cl.
CPC ............. *H04L 65/612* (2022.05); *G06F 3/165* (2013.01); *G06F 16/29* (2019.01); *G06F 16/735* (2019.01); *G06F 16/9537* (2019.01); *H04L 65/60* (2013.01); *H04L 67/06* (2013.01); *H04L 67/10* (2013.01); *H04L 67/52* (2022.05);
(Continued)

(58) Field of Classification Search
CPC ....... H04L 65/612; H04L 65/60; H04L 67/06; H04L 67/10; H04L 67/52; H04L 67/535; G06F 3/165; G06F 16/29; G06F 16/735; G06F 16/9537; H04N 21/25841; H04N 21/41265; H04N 21/43615;
(Continued)

(56) References Cited

U.S. PATENT DOCUMENTS

| 7,391,791 B2 * | 6/2008 | Balassanian | ........... | H04N 5/765 |
| | | | | 370/503 |
| 2007/0038999 A1 * | 2/2007 | Millington | ............... | H03G 3/00 |
| | | | | 718/100 |

(Continued)

*Primary Examiner* — Benjamin M Thieu
(74) *Attorney, Agent, or Firm* — FORTEM IP LLP

(57) ABSTRACT

Example techniques disclosed herein relate to location-based playlists. In an example implementation, a system receives, from a mobile device, first GPS data indicating that the mobile device is located at a first physical location, wherein an application on the mobile device is registered with a particular user account of the cloud service. The system determines that the first physical location represented in the first GPS data corresponds to a location of a first business associated with one or more first playback devices within the cloud service. The one or more first playback devices are playing back first audio tracks. As each first audio track is at least partially played back, the system adds the respective first audio track to a location-based playlist associated with the particular user account of the cloud service. The computing system causes the mobile device to display an indication of the location-based playlist.

20 Claims, 9 Drawing Sheets

Related U.S. Application Data continuation of application No. 17/562,266, filed on Dec. 27, 2021, now Pat. No. 11,729,233, which is a continuation of application No. 16/522,364, filed on Jul. 25, 2019, now Pat. No. 11,218,524, which is a continuation of application No. 15/092,030, filed on Apr. 6, 2016, now Pat. No. 10,367,868, which is a continuation of application No. 14/244,246, filed on Apr. 3, 2014, now Pat. No. 9,705,950.

(51) Int. Cl.

| | |
|---|---|
| *G06F 16/29* | (2019.01) |
| *G06F 16/735* | (2019.01) |
| *G06F 16/9537* | (2019.01) |
| *H04L 65/60* | (2022.01) |
| *H04L 67/06* | (2022.01) |
| *H04L 67/10* | (2022.01) |
| *H04L 67/50* | (2022.01) |
| *H04L 67/52* | (2022.01) |
| *H04N 21/258* | (2011.01) |
| *H04N 21/41* | (2011.01) |
| *H04N 21/436* | (2011.01) |
| *H04N 21/845* | (2011.01) |
| *H04R 27/00* | (2006.01) |
| *H04W 4/02* | (2018.01) |
| *H04W 4/029* | (2018.01) |

(52) U.S. Cl.
CPC ..... *H04L 67/535* (2022.05); *H04N 21/25841* (2013.01); *H04N 21/41265* (2020.08); *H04N 21/43615* (2013.01); *H04N 21/8456* (2013.01); *H04R 27/00* (2013.01); *H04W 4/02* (2013.01); *H04W 4/029* (2018.02); *H04R 2227/005* (2013.01)

(58) Field of Classification Search
CPC .... H04N 21/8456; H04W 4/02; H04W 4/029; H04R 27/00; H04R 2227/005
See application file for complete search history.

(56) References Cited

U.S. PATENT DOCUMENTS

| | | | | |
|---|---|---|---|---|
| 2008/0109404 | A1* | 5/2008 | Holm ...................... | G06F 16/68 |
| 2009/0064056 | A1* | 3/2009 | Anderson .......... | G06Q 20/3224 |
| | | | | 715/864 |
| 2012/0158769 | A1* | 6/2012 | Gratton ................... | G06F 16/68 |
| | | | | 707/769 |
| 2012/0191510 | A1* | 7/2012 | Cameron ............... | H04H 60/52 |
| | | | | 705/26.61 |
| 2014/0031961 | A1* | 1/2014 | Wansley ............... | G06F 16/639 |
| | | | | 700/94 |
| 2014/0122589 | A1* | 5/2014 | Fyke ................ | H04N 21/44227 |
| | | | | 709/204 |

* cited by examiner

600

START

602

Receiving an indication that a user was at a location at a particular time

604

Identifying at least one portion of media content playing at the location at the particular time

606

Transmitting data that indicates the identified at least one portion of media content to a computing device associated with the user

END

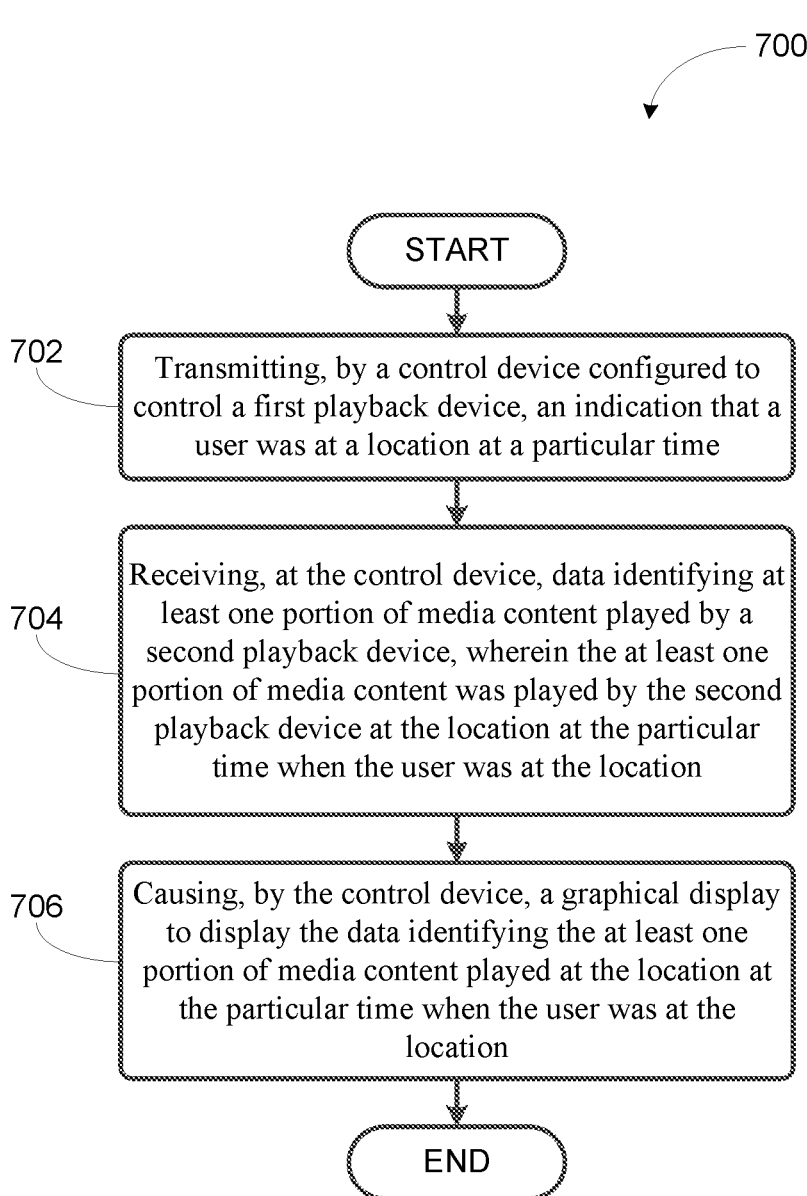

700

START

702
Transmitting, by a control device configured to control a first playback device, an indication that a user was at a location at a particular time 704
Receiving, at the control device, data identifying at least one portion of media content played by a second playback device, wherein the at least one portion of media content was played by the second playback device at the location at the particular time when the user was at the location 706
Causing, by the control device, a graphical display to display the data identifying the at least one portion of media content played at the location at the particular time when the user was at the location

END

| 802 | 804 | 806 | 808 | 810 | 812 |
|-----|-----|-----|-----|-----|-----|
| 3:42:00 PM | Song A | Artist 1 | Album i | (3:46) | Joe's Coffee Shop |
| 3:45:46 PM | Song B | Artist 2 | Album ii | (5:44) | Joe's Coffee Shop |
| 3:51:30 PM | Song C | Artist 3 | Album iii | (2:16) | Joe's Coffee Shop |
| 3:53:46 PM | Song D | Artist 4 | Album iv | (4:51) | Joe's Coffee Shop |
| 3:58:37 PM | Song E | Artist 5 | Album v | (3:57) | Joe's Coffee Shop |
| 4:02:34 PM | Song F | Artist 6 | Album vi | (3:56) | Joe's Coffee Shop |
| 4:06:30 PM | Song G | Artist 7 | Album vii | (5:55) | Joe's Coffee Shop |
| 4:12:25 PM | Song H | Artist 8 | Album viii | (5:24) | Joe's Coffee Shop |

820

822
S

900

| | | | | |
|---|---|---|---|---|
| 3:42:00 PM | Song A | Artist 1 | Album i | (3:46) | John's Tavern |
| 3:45:46 PM | Song B | Artist 2 | Album ii | (5:44) | John's Tavern |
| 3:51:30 PM | Song C | Artist 3 | Album iii | (2:16) | John's Tavern |
| 3:53:46 PM | Song D | Artist 4 | Album iv | (4:51) | John's Tavern |
| 3:58:37 PM | Song E | Artist 5 | Album v | (3:57) | John's Tavern |
| 4:02:34 PM | Song F | Artist 6 | Album vi | (3:56) | Joe's Coffee Shop |
| 4:06:30 PM | Song G | Artist 7 | Album vii | (5:55) | Joe's Coffee Shop |
| 4:12:25 PM | Song H | Artist 8 | Album viii | (5:24) | Joe's Coffee Shop |

| | | | | |
|---|---|---|---|---|
| 3:42:00 PM | Song A | Artist 1 | Album i | (3:46) | Joe's Coffee Shop |
| 3:45:46 PM | Song B | Artist 2 | Album ii | (5:44) | Joe's Coffee Shop |
| 4:02:34 PM | Song F | Artist 6 | Album vi | (3:56) | Joe's Coffee Shop |
| 4:06:30 PM | Song G | Artist 7 | Album vii | (5:55) | Joe's Coffee Shop |
| 4:12:25 PM | Song H | Artist 8 | Album viii | (5:24) | Joe's Coffee Shop |
| 3:51:30 PM | Song C | Artist 3 | Album iii | (2:16) | John's Tavern |
| 3:53:46 PM | Song D | Artist 4 | Album iv | (4:51) | John's Tavern |
| 3:58:37 PM | Song E | Artist 5 | Album v | (3:57) | John's Tavern |

LOCATION-BASED PLAYLIST GENERATION

CROSS REFERENCE TO RELATED APPLICATIONS

This application is a continuation of U.S. patent application Ser. No. 18/338,887, filed on Jun. 21, 2023, issued as U.S. Pat. No. 12,063,261 on Aug. 13, 2024, which is a continuation of U.S. patent application Ser. No. 17/562,266, filed on Dec. 27, 2021, issued as U.S. Pat. No. 11,729,233 on Aug. 15, 2023, which is a continuation of U.S. patent application Ser. No. 16/522,364, filed on Jul. 25, 2019, issued as U.S. Pat. No. 11,218,524 on Jan. 4, 2022, which is a continuation of U.S. patent application Ser. No. 15/092, 030, filed on Apr. 6, 2016, issued as U.S. Pat. No. 10,367, 868 on Jul. 30, 2019, which is a continuation of U.S. patent application Ser. No. 14/244,246, filed on Apr. 3, 2014, issued as U.S. Pat. No. 9,705,950 on Jul. 11, 2017, each of which is incorporated herein by reference in its entirety.

FIELD OF THE DISCLOSURE

The disclosure is related to consumer goods and, more particularly, to methods, systems, products, features, services, and other elements directed to media playback or some aspect thereof.

BACKGROUND

Options for accessing and listening to digital audio in an out-loud setting were limited until in 2003, when SONOS, Inc. filed for one of its first patent applications, entitled "Method for Synchronizing Audio Playback between Multiple Networked Devices," and began offering a media playback system for sale in 2005. The Sonos Wireless HiFi System enables people to experience music from many sources via one or more networked playback devices. Through a software control application installed on a smartphone, tablet, or computer, one can play what he or she wants in any room that has a networked playback device. Additionally, using the controller, for example, different songs can be streamed to each room with a playback device, rooms can be grouped together for synchronous playback, or the same song can be heard in all rooms synchronously.

Given the ever growing interest in digital media, there continues to be a need to develop consumer-accessible technologies to further enhance the listening experience.

BRIEF DESCRIPTION OF THE DRAWINGS

Features, aspects, and advantages of the presently disclosed technology may be better understood with regard to the following description, appended claims, and accompanying drawings where:

FIG. 7 shows an example flow diagram for an example method;

FIG. 9 shows an example display; and

FIG. 10 shows an example display.

Figure 1:
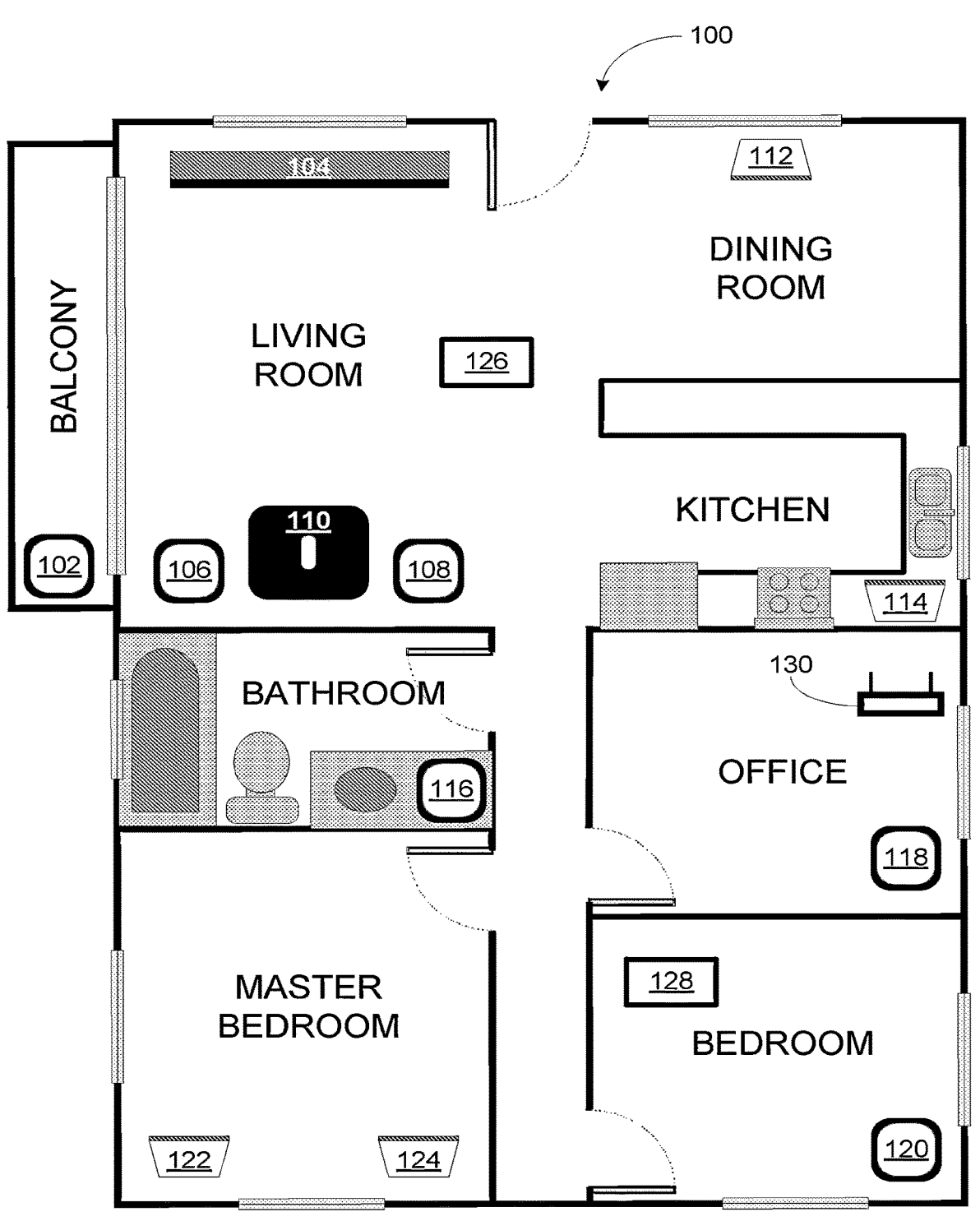
FIG. 1 shows an example media playback system configuration in which certain embodiments may be practiced.

The drawings are for the purpose of illustrating example embodiments, but it is understood that the inventions are not limited to the arrangements and instrumentality shown in the drawings.

DETAILED DESCRIPTION

I. Overview

Users of mobile computing devices, such as laptop computers or smartphones, may travel to various locations throughout a day. At some of these locations there may be network-enabled media playback devices playing media content, such as music, movies, talk radio, or other audio/ visual content. A user at one of these locations may hear or see a portion of media content that the user would like to hear or see again. Additionally and/or alternatively, the user may wish to receive additional information about the portion of media content, such as a song title, an associated artist, or an album title, among other examples.

In some cases, the user might use a media identifier application running on a mobile computing device to retrieve information that identifies a portion of media content that the user wishes to know more about. For example, the user may initiate the application while the portion of media content is playing at the location, and the application may cause the mobile computing device to record or "listen" to the portion of media content, perhaps with an integrated microphone. The recorded portion of media content may be transmitted to a server so that the server may compare the recorded portion to a database of known portions of media content. If the server finds a match, the server may transmit an indication of the match to the user's mobile computing device, thereby identifying the portion of media content for the user.

However, it may be inefficient or otherwise undesirable for the user to initiate a media identifier application as described above. For instance, it may be undesirable for the user to initiate the application every time the user hears or sees media content of interest being played at various locations. Further, the user may wish to obtain information regarding the media content of interest at a later time and in a more intuitive manner.

As such, according to some example implementations described herein, a user might identify media content in a more efficient and/or desirable manner. A mobile computing device associated with a user may provide a server with information about the user's location history, and the server may then determine portions of media content that were played by media playback system(s) at various locations corresponding to the location history of the user. To enable this, the server may collect playlist information from network-enabled media playback systems at the various locations. Later, the server may then provide, to the user's computing device (or another suitable device), information related to media content that was playing at a location that the user was at during a time period of interest.

Accordingly, some embodiments described herein involve, among other things, providing from a server to a control device, information regarding media content that was played by a media playback device while a user was at a location corresponding to the media playback device. Some embodiments further involve a control device displaying the information received from the server and providing a capability for a user to control another media playback device by, perhaps, causing the media playback device to play the identified media content. Other aspects of the embodiments will be made apparent in the remainder of the description herein.

In one aspect, a method is provided. The method involves receiving an indication that a user was at a location at a particular time; identifying at least one portion of media content playing at the location at the particular time; and transmitting data that indicates the identified at least one portion of media content to a computing device associated with the user.

In another aspect, a computing device is provided. In some implementations, the computing device may be a server device. The computing device includes a processor and memory storing instructions that when executed by the computing device, cause the computing device to perform functions. The functions include receiving an indication that a user was at a location at a particular time; identifying at least one portion of media content playing at the location at the particular time; and transmitting data that indicates the identified at least one portion of media content to a computing device associated with the user.

In yet another aspect, a non-transitory computer readable memory is provided. The non-transitory computer readable memory has stored thereon instructions executable by a computing device to cause the computing device to perform functions. The functions include receiving an indication that a user was at a location at a particular time; identifying at least one portion of media content playing at the location at the particular time; and transmitting data that indicates the identified at least one portion of media content to a computing device associated with the user.

In another aspect, a method is provided. The method involves transmitting, by a control device configured to control a first playback device, an indication that a user was at a location at a particular time and receiving, at the control device, data identifying at least one portion of media content played by a second playback device. The at least one portion of media content was played by the second playback device at the location at the particular time when the user was at the location. The method further includes causing, by the control device, a graphical display to display the data identifying the at least one portion of media content played at the location at the particular time when the user was at the location.

In another aspect, a control device configured to control a first playback device is provided. The control device includes a processor and memory storing instructions that when executed by the control device, cause the device to perform functions. The functions include transmitting an indication that a user was at a location at a particular time and receiving data identifying at least one portion of media content played by a second playback device. The at least one portion of media content was played by the second playback device at the location at the particular time when the user was at the location. The method further includes causing a graphical display to display the data identifying the at least one portion of media content played at the location at the particular time when the user was at the location.

In yet another aspect, a non-transitory computer readable memory is provided. The non-transitory computer readable memory has stored thereon instructions executable by a computing device configured to control a first playback device to cause the computing device to perform functions. The functions include transmitting an indication that a user was at a location at a particular time and receiving data identifying at least one portion of media content played by a second playback device. The at least one portion of media content was played by the second playback device at the location at the particular time when the user was at the location. The method further includes causing a graphical display to display the data identifying the at least one portion of media content played at the location at the particular time when the user was at the location.

It will be understood by one of ordinary skill in the art that this disclosure includes numerous other embodiments.

II. Example Operating Environment

FIG. 1 shows an example configuration of a media playback system 100 in which one or more embodiments disclosed herein may be practiced or implemented. The media playback system 100 as shown is associated with an example home environment having several rooms and spaces, such as for example, a master bedroom, an office, a dining room, and a living room. As shown in the example of FIG. 1, the media playback system 100 includes playback devices 102-124, control devices 126 and 128, and a wired or wireless network router 130.

Further discussions relating to the different components of the example media playback system 100 and how the different components may interact to provide a user with a media experience may be found in the following sections. While discussions herein may generally refer to the example media playback system 100, technologies described herein are not limited to applications within, among other things, the home environment as shown in FIG. 1. For instance, the technologies described herein may be useful in environments where multi-zone audio may be desired, such as, for example, a commercial setting like a restaurant, mall or airport, a vehicle like a sports utility vehicle (SUV), bus or car, a ship or boat, an airplane, and so on.

a. Example Playback Devices

Figure 2:
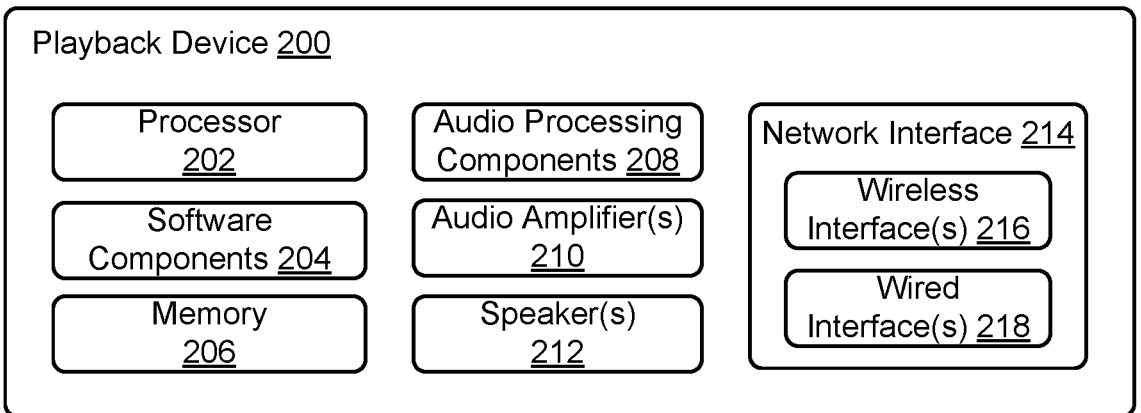
FIG. 2 shows a functional block diagram of an example playback device.

FIG. 2 shows a functional block diagram of an example playback device 200 that may be configured to be one or more of the playback devices 102-124 of the media playback system 100 of FIG. 1. The playback device 200 may include a processor 202, software components 204, memory 206, audio processing components 208, audio amplifier(s) 210, speaker(s) 212, and a network interface 214 including wireless interface(s) 216 and wired interface(s) 218. In one case, the playback device 200 may not include the speaker(s) 212, but rather a speaker interface for connecting the playback device 200 to external speakers. In another case, the playback device 200 may include neither the speaker(s) 212 nor the audio amplifier(s) 210, but rather an audio interface for connecting the playback device 200 to an external audio amplifier or audio-visual receiver.

In one example, the processor 202 may be a clock-driven computing component configured to process input data according to instructions stored in the memory 206. The memory 206 may be a tangible computer-readable medium configured to store instructions executable by the processor 202. For instance, the memory 206 may be data storage that can be loaded with one or more of the software components 204 executable by the processor 202 to achieve certain functions. In one example, the functions may involve the playback device 200 retrieving audio data from an audio source or another playback device. In another example, the functions may involve the playback device 200 sending audio data to another device or playback device on a network. In yet another example, the functions may involve pairing of the playback device 200 with one or more playback devices to create a multi-channel audio environment.

Certain functions may involve the playback device 200 synchronizing playback of audio content with one or more other playback devices. During synchronous playback, a listener will preferably not be able to perceive time-delay differences between playback of the audio content by the playback device 200 and the one or more other playback devices. U.S. Pat. No. 8,234,395 entitled, "System and method for synchronizing operations among a plurality of independently clocked digital data processing devices," which is hereby incorporated by reference, provides in more detail some examples for audio playback synchronization among playback devices.

The memory 206 may further be configured to store data associated with the playback device 200, such as one or more zones and/or zone groups the playback device 200 is a part of, audio sources accessible by the playback device 200, or a playback queue that the playback device 200 (or some other playback device) may be associated with. The data may be stored as one or more state variables that are periodically updated and used to describe the state of the playback device 200. The memory 206 may also include the data associated with the state of the other devices of the media system, and shared from time to time among the devices so that one or more of the devices have the most recent data associated with the system. Other embodiments are also possible.

The audio processing components 208 may include one or more digital-to-analog converters (DAC), an audio preprocessing component, an audio enhancement component or a digital signal processor (DSP), and so on. In one embodiment, one or more of the audio processing components 208 may be a subcomponent of the processor 202. In one example, audio content may be processed and/or intentionally altered by the audio processing components 208 to produce audio signals. The produced audio signals may then be provided to the audio amplifier(s) 210 for amplification and playback through speaker(s) 212. Particularly, the audio amplifier(s) 210 may include devices configured to amplify audio signals to a level for driving one or more of the speakers 212. The speaker(s) 212 may include an individual transducer (e.g., a "driver") or a complete speaker system involving an enclosure with one or more drivers. A particular driver of the speaker(s) 212 may include, for example, a subwoofer (e.g., for low frequencies), a mid-range driver (e.g., for middle frequencies), and/or a tweeter (e.g., for high frequencies). In some cases, each transducer in the one or more speakers 212 may be driven by an individual corresponding audio amplifier of the audio amplifier(s) 210. In addition to producing analog signals for playback by the playback device 200, the audio processing components 208 may be configured to process audio content to be sent to one or more other playback devices for playback.

Audio content to be processed and/or played back by the playback device 200 may be received from an external source, such as via an audio line-in input connection (e.g., an auto-detecting 3.5 mm audio line-in connection) or the network interface 214.

The network interface 214 may be configured to facilitate a data flow between the playback device 200 and one or more other devices on a data network. As such, the playback device 200 may be configured to receive audio content over the data network from one or more other playback devices in communication with the playback device 200, network devices within a local area network, or audio content sources over a wide area network such as the Internet. In one example, the audio content and other signals transmitted and received by the playback device 200 may be transmitted in the form of digital packet data containing an Internet Protocol (IP)-based source address and IP-based destination addresses. In such a case, the network interface 214 may be configured to parse the digital packet data such that the data destined for the playback device 200 is properly received and processed by the playback device 200.

As shown, the network interface 214 may include wireless interface(s) 216 and wired interface(s) 218. The wireless interface(s) 216 may provide network interface functions for the playback device 200 to wirelessly communicate with other devices (e.g., other playback device(s), speaker(s), receiver(s), network device(s), control device(s) within a data network the playback device 200 is associated with) in accordance with a communication protocol (e.g., any wireless standard including IEEE 802.11a, 802.11b, 802.11g, 802.11n, 802.11ac, 802.15, 4G mobile communication standard, and so on). The wired interface(s) 218 may provide network interface functions for the playback device 200 to communicate over a wired connection with other devices in accordance with a communication protocol (e.g., IEEE 802.3). While the network interface 214 shown in FIG. 2 includes both wireless interface(s) 216 and wired interface(s) 218, the network interface 214 may in some embodiments include only wireless interface(s) or only wired interface(s).

In one example, the playback device 200 and one other playback device may be paired to play two separate audio components of audio content. For instance, playback device 200 may be configured to play a left channel audio component, while the other playback device may be configured to play a right channel audio component, thereby producing or enhancing a stereo effect of the audio content. The paired playback devices (also referred to as "bonded playback devices") may further play audio content in synchrony with other playback devices.

In another example, the playback device 200 may be sonically consolidated with one or more other playback devices to form a single, consolidated playback device. A consolidated playback device may be configured to process and reproduce sound differently than an unconsolidated playback device or playback devices that are paired, because a consolidated playback device may have additional speaker drivers through which audio content may be rendered. For instance, if the playback device 200 is a playback device designed to render low frequency range audio content (i.e. a subwoofer), the playback device 200 may be consolidated with a playback device designed to render full frequency range audio content. In such a case, the full frequency range playback device, when consolidated with the low frequency playback device 200, may be configured to render only the mid and high frequency components of audio content, while the low frequency range playback device 200 renders the low frequency component of the audio content. The consolidated playback device may further be paired with a single playback device or yet another consolidated playback device.

By way of illustration, SONOS, Inc. presently offers (or has offered) for sale certain playback devices including a "PLAY:1," "PLAY:3," "PLAY:5," "PLAYBAR," "CONNECT:AMP," "CONNECT," and "SUB." Any other past, present, and/or future playback devices may additionally or alternatively be used to implement the playback devices of example embodiments disclosed herein. Additionally, it is understood that a playback device is not limited to the example illustrated in FIG. 2 or to the SONOS product offerings. For example, a playback device may include a wired or wireless headphone. In another example, a playback device may include or interact with a docking station for personal mobile media playback devices. In yet another example, a playback device may be integral to another device or component such as a television, a lighting fixture, or some other device for indoor or outdoor use.

b. Example Playback Zone Configurations

Referring back to the media playback system 100 of FIG. 1, the environment may have one or more playback zones, each with one or more playback devices. The media playback system 100 may be established with one or more playback zones, after which one or more zones may be added, or removed to arrive at the example configuration shown in FIG. 1. Each zone may be given a name according to a different room or space such as an office, bathroom, master bedroom, bedroom, kitchen, dining room, living room, and/or balcony. In one case, a single playback zone may include multiple rooms or spaces. In another case, a single room or space may include multiple playback zones.

As shown in FIG. 1, the balcony, dining room, kitchen, bathroom, office, and bedroom zones each have one playback device, while the living room and master bedroom zones each have multiple playback devices. In the living room zone, playback devices 104, 106, 108, and 110 may be configured to play audio content in synchrony as individual playback devices, as one or more bonded playback devices, as one or more consolidated playback devices, or any combination thereof. Similarly, in the case of the master bedroom, playback devices 122 and 124 may be configured to play audio content in synchrony as individual playback devices, as a bonded playback device, or as a consolidated playback device.

In one example, one or more playback zones in the environment of FIG. 1 may each be playing different audio content. For instance, the user may be grilling in the balcony zone and listening to hip hop music being played by the playback device 102 while another user may be preparing food in the kitchen zone and listening to classical music being played by the playback device 114. In another example, a playback zone may play the same audio content in synchrony with another playback zone. For instance, the user may be in the office zone where the playback device 118 is playing the same rock music that is being playing by playback device 102 in the balcony zone. In such a case, playback devices 102 and 118 may be playing the rock music in synchrony such that the user may seamlessly (or at least substantially seamlessly) enjoy the audio content that is being played out-loud while moving between different playback zones. Synchronization among playback zones may be achieved in a manner similar to that of synchronization among playback devices, as described in previously referenced U.S. Pat. No. 8,234,395.

As suggested above, the zone configurations of the media playback system 100 may be dynamically modified, and in some embodiments, the media playback system 100 supports numerous configurations. For instance, if a user physically moves one or more playback devices to or from a zone, the media playback system 100 may be reconfigured to accommodate the change(s). For instance, if the user physically moves the playback device 102 from the balcony zone to the office zone, the office zone may now include both the playback device 118 and the playback device 102. The playback device 102 may be paired or grouped with the office zone and/or renamed if so desired via a control device such as the control devices 126 and 128. On the other hand, if the one or more playback devices are moved to a particular area in the home environment that is not already a playback zone, a new playback zone may be created for the particular area.

Further, different playback zones of the media playback system 100 may be dynamically combined into zone groups or split up into individual playback zones. For instance, the dining room zone and the kitchen zone 114 may be combined into a zone group for a dinner party such that playback devices 112 and 114 may render audio content in synchrony. On the other hand, the living room zone may be split into a television zone including playback device 104, and a listening zone including playback devices 106, 108, and 110, if the user wishes to listen to music in the living room space while another user wishes to watch television.

c. Example Control Devices

Figure 3:
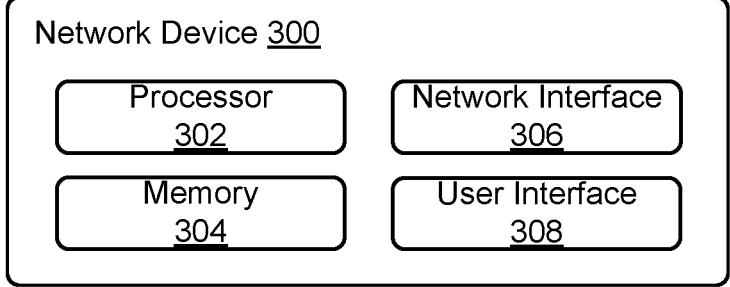
FIG. 3 shows a functional block diagram of an example control device.

FIG. 3 shows a functional block diagram of an example control device 300 that may be configured to be one or both of the control devices 126 and 128 of the media playback system 100. As shown, the control device 300 may include a processor 302, memory 304, a network interface 306, and a user interface 308. In one example, the control device 300 may be a dedicated controller for the media playback system 100. In another example, the control device 300 may be a network device on which media playback system controller application software may be installed, such as for example, an iPhone™, iPad™ or any other smart phone, tablet or network device (e.g., a networked computer such as a PC or Mac™).

The processor 302 may be configured to perform functions relevant to facilitating user access, control, and configuration of the media playback system 100. The memory 304 may be configured to store instructions executable by the processor 302 to perform those functions. The memory 304 may also be configured to store the media playback system controller application software and other data associated with the media playback system 100 and the user.

In one example, the network interface 306 may be based on an industry standard (e.g., infrared, radio, wired standards including IEEE 802.3, wireless standards including IEEE 802.11a, 802.11b, 802.11g, 802.11n, 802.11ac, 802.15, 4G mobile communication standard, and so on). The network interface 306 may provide a means for the control device 300 to communicate with other devices in the media playback system 100. In one example, data and information (e.g., such as a state variable) may be communicated between control device 300 and other devices via the network interface 306. For instance, playback zone and zone group configurations in the media playback system 100 may be received by the control device 300 from a playback device or another network device, or transmitted by the control device 300 to another playback device or network device via the network interface 306. In some cases, the other network device may be another control device.

Playback device control commands such as volume control and audio playback control may also be communicated from the control device 300 to a playback device via the network interface 306. As suggested above, changes to configurations of the media playback system 100 may also be performed by a user using the control device 300. The configuration changes may include adding/removing one or more playback devices to/from a zone, adding/removing one or more zones to/from a zone group, forming a bonded or consolidated player, separating one or more playback devices from a bonded or consolidated player, among others. Accordingly, the control device 300 may sometimes be referred to as a controller, whether the control device 300 is a dedicated controller or a network device on which media playback system controller application software is installed.

Figure 4:
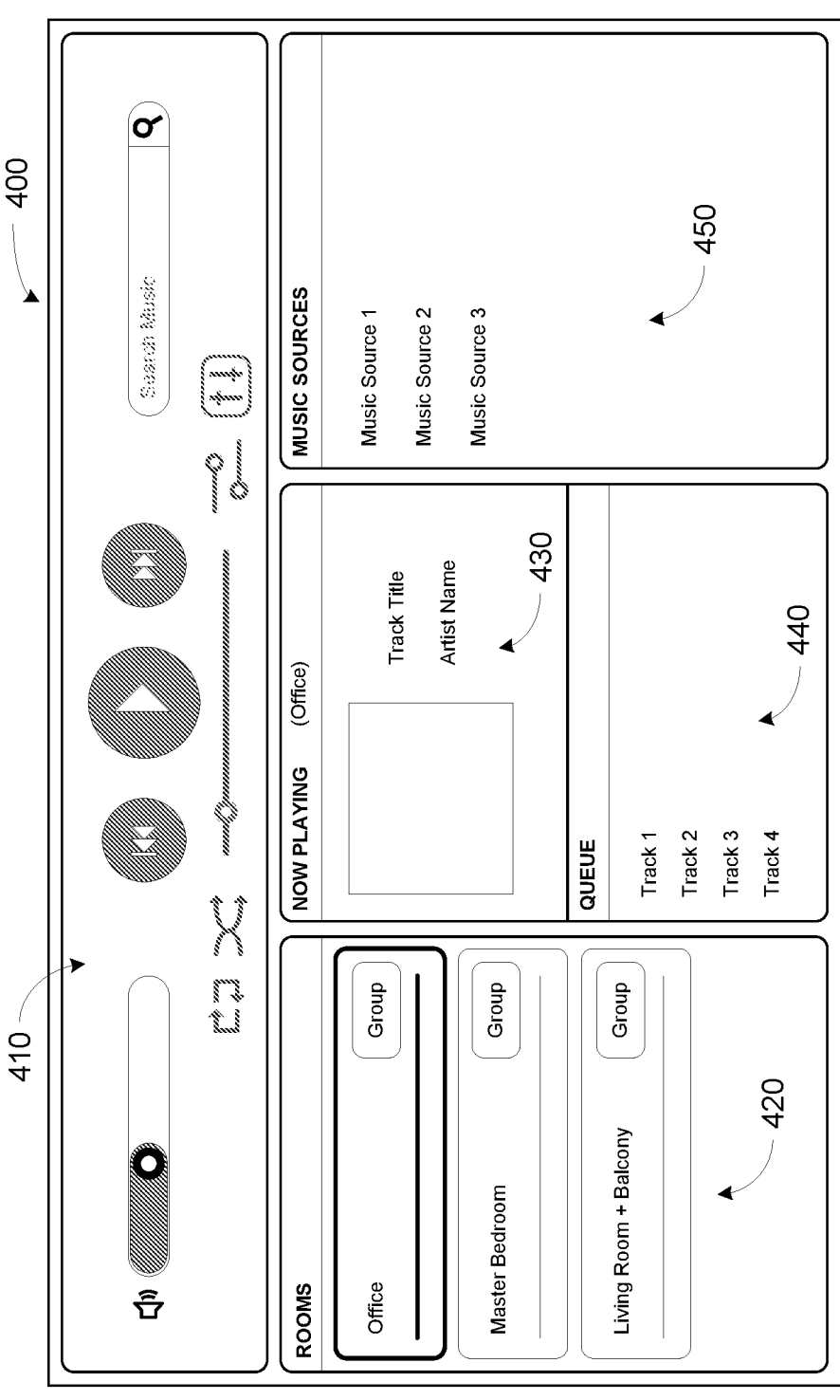
FIG. 4 shows an example controller interface.

The user interface 308 of the control device 300 may be configured to facilitate user access and control of the media playback system 100, by providing a controller interface such as the controller interface 400 shown in FIG. 4. The controller interface 400 includes a playback control region 410, a playback zone region 420, a playback status region 430, a playback queue region 440, and an audio content sources region 450. The user interface 400 as shown is just one example of a user interface that may be provided on a network device such as the control device 300 of FIG. 3 (and/or the control devices 126 and 128 of FIG. 1) and accessed by users to control a media playback system such as the media playback system 100. Other user interfaces of varying formats, styles, and interactive sequences may alternatively be implemented on one or more network devices to provide comparable control access to a media playback system.

The playback control region 410 may include selectable (e.g., by way of touch or by using a cursor) icons to cause playback devices in a selected playback zone or zone group to play or pause, fast forward, rewind, skip to next, skip to previous, enter/exit shuffle mode, enter/exit repeat mode, enter/exit cross fade mode. The playback control region 410 may also include selectable icons to modify equalization settings, and playback volume, among other possibilities.

The playback zone region 420 may include representations of playback zones within the media playback system 100. In some embodiments, the graphical representations of playback zones may be selectable to bring up additional selectable icons to manage or configure the playback zones in the media playback system, such as a creation of bonded zones, creation of zone groups, separation of zone groups, and renaming of zone groups, among other possibilities.

For example, as shown, a "group" icon may be provided within each of the graphical representations of playback zones. The "group" icon provided within a graphical representation of a particular zone may be selectable to bring up options to select one or more other zones in the media playback system to be grouped with the particular zone. Once grouped, playback devices in the zones that have been grouped with the particular zone will be configured to play audio content in synchrony with the playback device(s) in the particular zone. Analogously, a "group" icon may be provided within a graphical representation of a zone group. In this case, the "group" icon may be selectable to bring up options to deselect one or more zones in the zone group to be removed from the zone group. Other interactions and implementations for grouping and ungrouping zones via a user interface such as the user interface 400 are also possible. The representations of playback zones in the playback zone region 420 may be dynamically updated as playback zone or zone group configurations are modified.

The playback status region 430 may include graphical representations of audio content that is presently being played, previously played, or scheduled to play next in the selected playback zone or zone group. The selected playback zone or zone group may be visually distinguished on the user interface, such as within the playback zone region 420 and/or the playback status region 430. The graphical representations may include track title, artist name, album name, album year, track length, and other relevant information that may be useful for the user to know when controlling the media playback system via the user interface 400.

The playback queue region 440 may include graphical representations of audio content in a playback queue associated with the selected playback zone or zone group. In some embodiments, each playback zone or zone group may be associated with a playback queue containing information corresponding to zero or more audio items for playback by the playback zone or zone group. For instance, each audio item in the playback queue may comprise a uniform resource identifier (URI), a uniform resource locator (URL) or some other identifier that may be used by a playback device in the playback zone or zone group to find and/or retrieve the audio item from a local audio content source or a networked audio content source, possibly for playback by the playback device.

In one example, a playlist may be added to a playback queue, in which case information corresponding to each audio item in the playlist may be added to the playback queue. In another example, audio items in a playback queue may be saved as a playlist. In a further example, a playback queue may be empty, or populated but "not in use" when the playback zone or zone group is playing continuously streaming audio content, such as Internet radio that may continue to play until otherwise stopped, rather than discrete audio items that have playback durations. In an alternative embodiment, a playback queue can include Internet radio and/or other streaming audio content items and be "in use" when the playback zone or zone group is playing those items. Other examples are also possible.

When playback zones or zone groups are "grouped" or "ungrouped," playback queues associated with the affected playback zones or zone groups may be cleared or re-associated. For example, if a first playback zone including a first playback queue is grouped with a second playback zone including a second playback queue, the established zone group may have an associated playback queue that is initially empty, that contains audio items from the first playback queue (such as if the second playback zone was added to the first playback zone), that contains audio items from the second playback queue (such as if the first playback zone was added to the second playback zone), or a combination of audio items from both the first and second playback queues. Subsequently, if the established zone group is ungrouped, the resulting first playback zone may be re-associated with the previous first playback queue, or be associated with a new playback queue that is empty or contains audio items from the playback queue associated with the established zone group before the established zone group was ungrouped. Similarly, the resulting second playback zone may be re-associated with the previous second playback queue, or be associated with a new playback queue that is empty, or contains audio items from the playback queue associated with the established zone group before the established zone group was ungrouped. Other examples are also possible.

Referring back to the user interface 400 of FIG. 4, the graphical representations of audio content in the playback queue region 440 may include track titles, artist names, track lengths, and other relevant information associated with the audio content in the playback queue. In one example, graphical representations of audio content may be selectable to bring up additional selectable icons to manage and/or manipulate the playback queue and/or audio content represented in the playback queue. For instance, a represented audio content may be removed from the playback queue, moved to a different position within the playback queue, or selected to be played immediately, or after any currently playing audio content, among other possibilities. A playback queue associated with a playback zone or zone group may be stored in a memory on one or more playback devices in the playback zone or zone group, on a playback device that is not in the playback zone or zone group, and/or some other designated device.

The audio content sources region 450 may include graphical representations of selectable audio content sources from which audio content may be retrieved and played by the selected playback zone or zone group. Discussions pertaining to audio content sources may be found in the following section.

d. Example Audio Content Sources

As indicated previously, one or more playback devices in a zone or zone group may be configured to retrieve for playback audio content (e.g. according to a corresponding URI or URL for the audio content) from a variety of available audio content sources. In one example, audio content may be retrieved by a playback device directly from a corresponding audio content source (e.g., a line-in connection). In another example, audio content may be provided to a playback device over a network via one or more other playback devices or network devices.

Example audio content sources may include a memory of one or more playback devices in a media playback system such as the media playback system 100 of FIG. 1, local music libraries on one or more network devices (such as a control device, a network-enabled personal computer, or a networked-attached storage (NAS), for example), streaming audio services providing audio content via the Internet (e.g., the cloud), or audio sources connected to the media playback system via a line-in input connection on a playback device or network devise, among other possibilities.

In some embodiments, audio content sources may be regularly added or removed from a media playback system such as the media playback system 100 of FIG. 1. In one example, an indexing of audio items may be performed whenever one or more audio content sources are added, removed or updated. Indexing of audio items may involve scanning for identifiable audio items in all folders/directory shared over a network accessible by playback devices in the media playback system, and generating or updating an audio content database containing metadata (e.g., title, artist, album, track length, among others) and other associated information, such as a URI or URL for each identifiable audio item found. Other examples for managing and maintaining audio content sources may also be possible.

The above discussions relating to playback devices, controller devices, playback zone configurations, and media content sources provide only some examples of operating environments within which functions and methods described below may be implemented. Other operating environments and configurations of media playback systems, playback devices, and network devices not explicitly described herein may also be applicable and suitable for implementation of the functions and methods.

III. Example Methods and Systems

As discussed above, some embodiments described herein may involve, among other things, providing from a first computing device (such as a server) to a second computing device (such as a control device configured to control a given media playback system associated with the control device), information regarding media content that was played by a media playback device while a user was at a location corresponding to the media playback device. Some embodiments further involve, a control device displaying the information received from the server and providing a capability for a user to control another media playback device by, perhaps, causing the media playback device to play the media content that was played by the playback device while the user was at the corresponding location. Other aspects of the embodiments will be made apparent in the remainder of the description herein.

In this section the term "computing device" may have the same meaning as the terms "network device" and/or "controller device" used in previous sections, unless it is clear from context that this is not the case. The term "server" may also be used interchangeably with the term "server device." Terminology such as "server," "server device," "controller," "controller device," "network device," and "computing device" are generally used for explanatory purposes in this disclosure and are not meant to be limiting. One of skill in the art will recognize that any suitable computing device may perform various functions disclosed herein and that the preceding list of terms is non-exhaustive.

Figure 5:
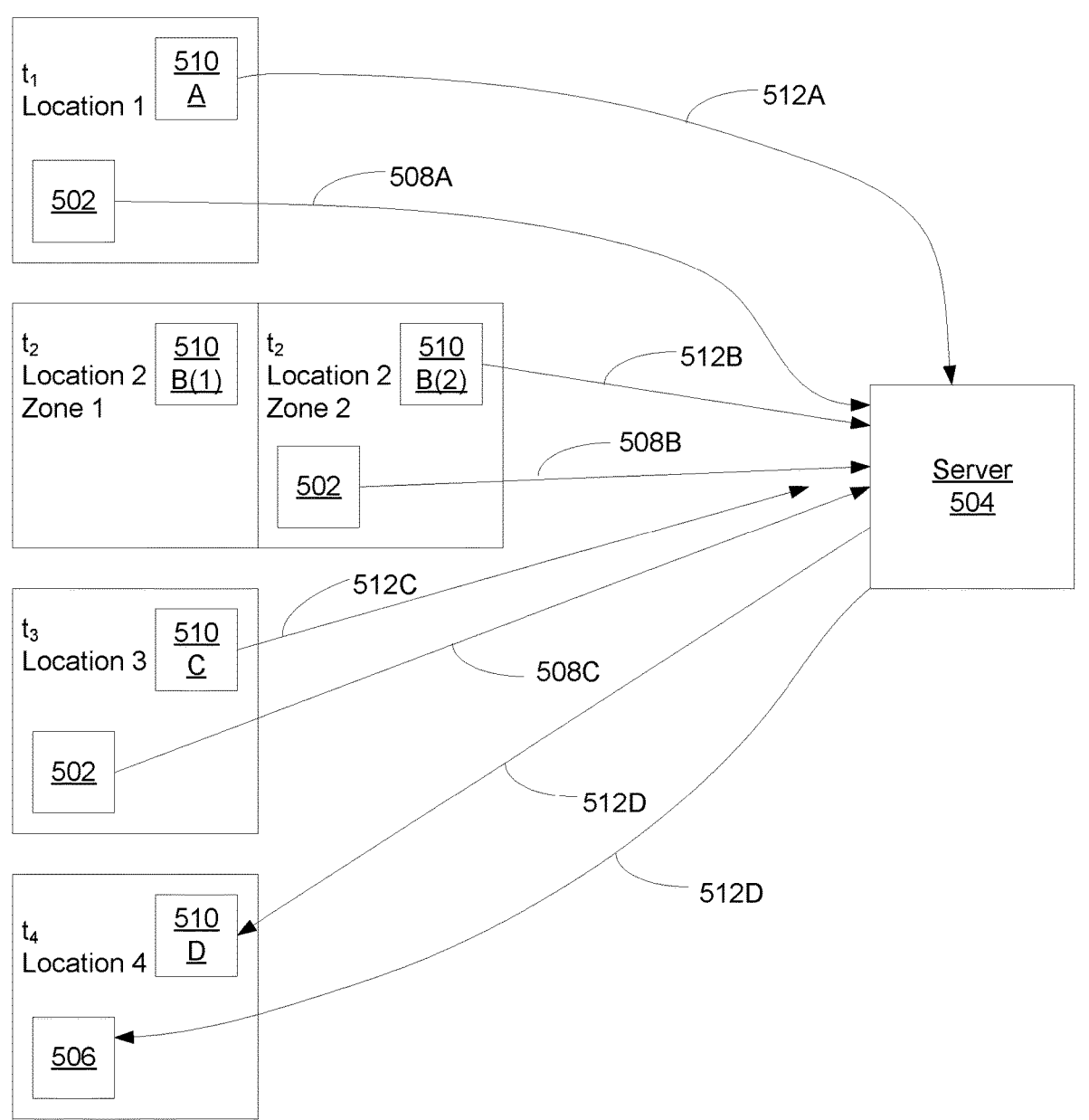
FIG. 5 shows example events and example devices.

FIG. 5 shows an example sequence of events and example devices, in accordance with at least some embodiments disclosed herein. Portions of FIG. 5 are referenced below with respect to a description of example methods 600 and 700, and so a brief overview of FIG. 5 is now provided. Certain aspects of FIG. 5 are discussed further below with respect to example methods 600 and 700.

FIG. 5 includes a computing device 502, a server 504, a control device 506, location messages 508A, 508B, and 508C, media playback devices 510A, 510B(1), 510B(2) 510C, and 510D, playlist data 512A, 512B, 512C, and 512D. In some embodiments, the computing device 502 and the control device 506 may be the same device, but in other embodiments they may be distinct devices.

The following description pertaining to FIG. 5 may depict a certain sequence of events and/or functions, but such a sequence is disclosed herein for illustrative purposes only and should not be construed as limiting. In other examples, the events and/or functions depicted in FIG. 5 may occur in a sequence different from that depicted in FIG. 5.

At time $t_1$, a user and the computing device 502 may be at Location 1 and the user may cause the computing device 502 to transmit a location message 508A (i.e. a message including information about the location of the computing device 502) to the server 504. In response to receiving the location message 508A, the server 504 may request to receive, from the media playback device 510A at Location 1, information regarding one or more portions of media content that was playing at time $t_1$ at Location 1 (i.e. playlist data 512A). In another example, the server 504 may periodically receive information regarding the one or more portions of media content from the playback device 510A, without previously receiving the location message 508A. In this case, the server 504 may identify the one or more portions of media content as playing at the location at the particular time minutes or even hours after receiving the information regarding the one or more portions of media content. Other examples are possible.

In some instances, the playlist data 512A may include information about portions of media content that were playing before and after time $t_1$ at Location 1 (i.e. during a time window that includes the particular time when the location message 508A was transmitted). The server 504 may then receive the playlist data 512A regarding the one or more portions of media content, from the media playback device 510A.

At time $t_2$ (after $t_1$ but before $t_3$), the user and the computing device 502 may be at Location 2 Zone 2 and the user may cause the computing device 502 to transmit the location message 508B to the server 504. The location message 508B may indicate that the computing device 502 is at Zone 2 of Location 2 (and not Zone 1 of Location 2). Zones 1 and 2 of Location 2 may be distinct playback zones of Location 2. In response to receiving the location message 508B, the server 504 may send a request, to the media playback device 510B(2) at Location 2 Zone 2, to receive information regarding one or more portions of media content that was playing at time $t_2$ at Location 2 Zone 2 (i.e. playlist data 512B). In some instances, the playlist data 512B may include information about portions of media content that were playing before and after time $t_2$ at Location 2. The server 504 may then receive the playlist data 512B regarding the one or more portions of media content, from the media playback device 510B(2).

At time $t_3$ (after $t_2$ but before $t_4$), the user and the computing device 502 may be at Location 3 and the user may cause the computing device 502 to transmit the location message 508C to the server 504. Based on receiving the location message 508C, the server may send a request, to the media playback device 510C at Location 3, to receive information regarding one or more portions of media content that was playing at time $t_3$ at Location 3 (i.e. playlist data 512C). In some instances, the playlist data 512C may include information about portions of media content that were playing before and after time $t_3$ at Location 3. The server 504 may then receive the playlist data 512C regarding the one or more portions of media content, from the media playback device 510C.

At time $t_4$ (after $t_3$), the server 504 may transmit to the control device 506 and/or the media playback device 510D, the playlist data 512D, which may include some or all of the playlist data 512A, 512B, and 512C. The media playback device 510D may be located at the user's home, for example, and the media playback device 510d and/or the control device 506 may use the playlist data 512D to retrieve and/or playback media content represented by the playlist data 512D. The server 504 may transmit the playlist data 512D based on receiving a request to do so from the control device 506, or in response to receiving a notification from the control device 506 or the media playback device 510D that the control device 506 is accessing the media playback device 510D.

Figure 6:
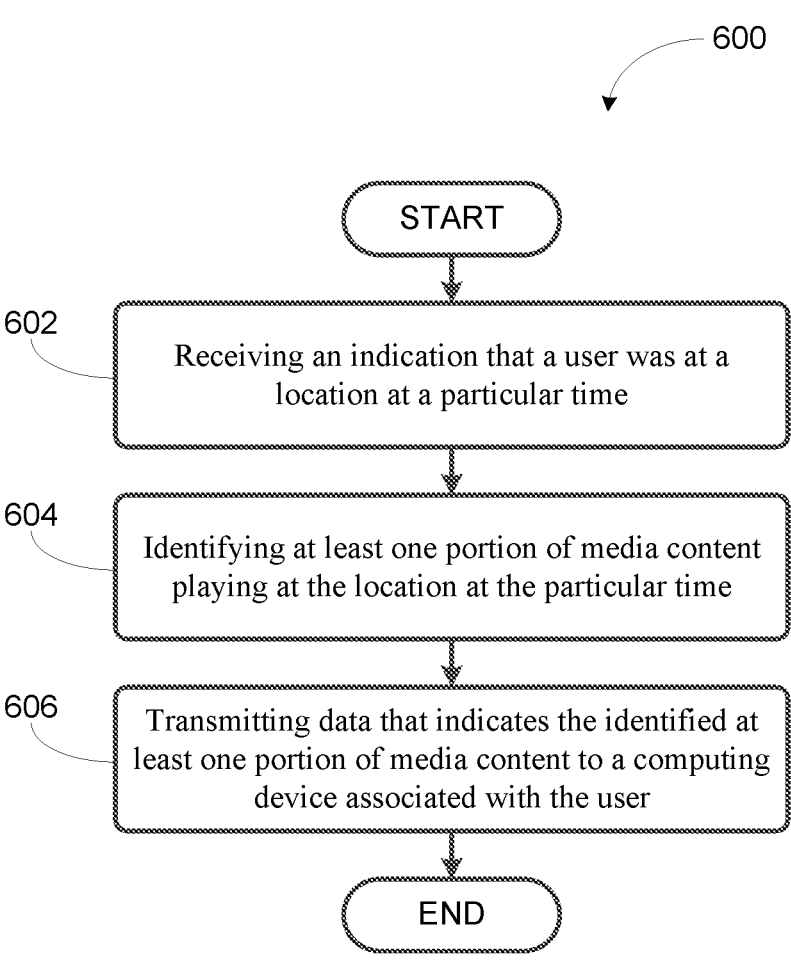
FIG. 6 shows an example flow diagram for an example method.

Method 600 shown in FIG. 6 presents an embodiment of a method that can be implemented within an operating environment involving, for example, the media playback system 100 of FIG. 1, one or more of the playback device 200 of FIG. 2, and one or more of the control device 300 of FIG. 3. Method 600 may include one or more operations, functions, or actions as illustrated by one or more of blocks 602-606. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 600 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 600 and other processes and methods disclosed herein, each block in FIG. 6 may represent circuitry that is wired to perform the specific logical functions in the process.

At block 602, the method includes receiving an indication that a user was at a location at a particular time. As one example, location message 508A in FIG. 5, may be received by server 504. Further, some examples of information that may be included in a location message are shown in column 812 of FIG. 8 (i.e. Joe's Coffee Shop). The location message may include a descriptive identifier of the location (e.g. John's Tavern), geolocation data corresponding to the location (e.g. 123 Fake Ave. or 410 16' 01.0" N 950 55' 59.1" W), a name of a computer network associated with the location (e.g. Bill's Router), and/or a time at which the location message was transmitted (e.g. 3:12 PM). Other such examples may exist.

In accordance with block 602 (and, in particular, the indication that a user was at a location at a particular time), a user may use a computing device such as a smartphone to transmit an indication in the form of a "check-in" message (i.e. a location message), to a server (i.e. a server device). (The server may function similar to network device 300 of FIG. 3 and have similar and/or additional components.) The user may transmit the "check-in" message because the user wishes to later be provided with data identifying a portion of media content playing at the location. The smartphone may transmit the indication in response to a user confirming a check-in location via a third-party application, such as a "social networking" application, running on the smartphone. The social networking application may, for example, cause the smartphone to display suggested check-in locations to the user based on detecting a WIFI hotspot that the smartphone is connected to, or based on the smartphone's GPS-resolved location. By way of illustration, the received indication may specify that the user was at "Joe's Coffee Shop" at 3:59 PM on Mar. 11, 2014. The server may receive the indication from the computing device over a wireless or wired network.

Alternatively, the server may receive the indication from an additional server associated with the third-party application. In this case, the user may have a user-account with the additional server associated with the third-party application, and the additional server may receive the location message from the user's computing device and then transmit the location message to the server. The indication may be received by the server from a computing device associated with the user that later receives data transmitted by the server at block 606, or may be received from an additional computing device associated with the user.

In some cases, the server may be configured to receive location messages directly from the user's computing device. For example, the server may receive the indication from a computing device that is executing an application used to control the user's media playback devices. The application may further be associated with the server in that the server may be directly integrated with the application, the user's media playback systems, and a database of the user's past locations. In this way, the server may be configured to receive location messages and associate locations of the user with portions of media content that were played at those locations.

In another example, the received indication may include an indication that the user conducted a financial transaction at the location. Perhaps upon the user opting in for such a process, the user may use a credit card to make a purchase at the location, and a network-enabled credit card scanner may send a location message to the server indicating that the cardholder (i.e. the user) was at the location at the particular time. In this way, the server may receive a location message indicating that the user was at the location at the particular time without the user having to explicitly transmit a message to the server.

In the examples described above with regard to block 602, the user may have full control over whether and/or how the user's location history is used. In one example, the user's location information will only be collected or used to identify media content if the user explicitly expresses consent to such collection or use. In another example, the server may refrain from collecting information that could be used for personally identifying the user, and may only collect information that could be used to identify a user-account. Also, the user may be able to opt out of location data collection and use at any time.

At block 604, the method includes identifying at least one portion of media content playing at the location at the particular time. The at least one portion of media content may include a fragment or a complete portion of audible or visible content, such as a pre-recorded song, live-streaming audio or video content, sports highlights, news stories, and talk radio segments, among other examples.

Before identifying the at least one portion of media content, the server may receive data identifying the at least one portion of media content playing at the location at the particular time. As one example, the playlist data 512A in FIG. 5 may be received by the server 504. The received data may include information about media content played at the location, and times at which the media content was played. The server may then identify the at least one portion of media content to be the portion of media content indicated, by the received data, to have been played at the location at the particular time.

Figure 8:
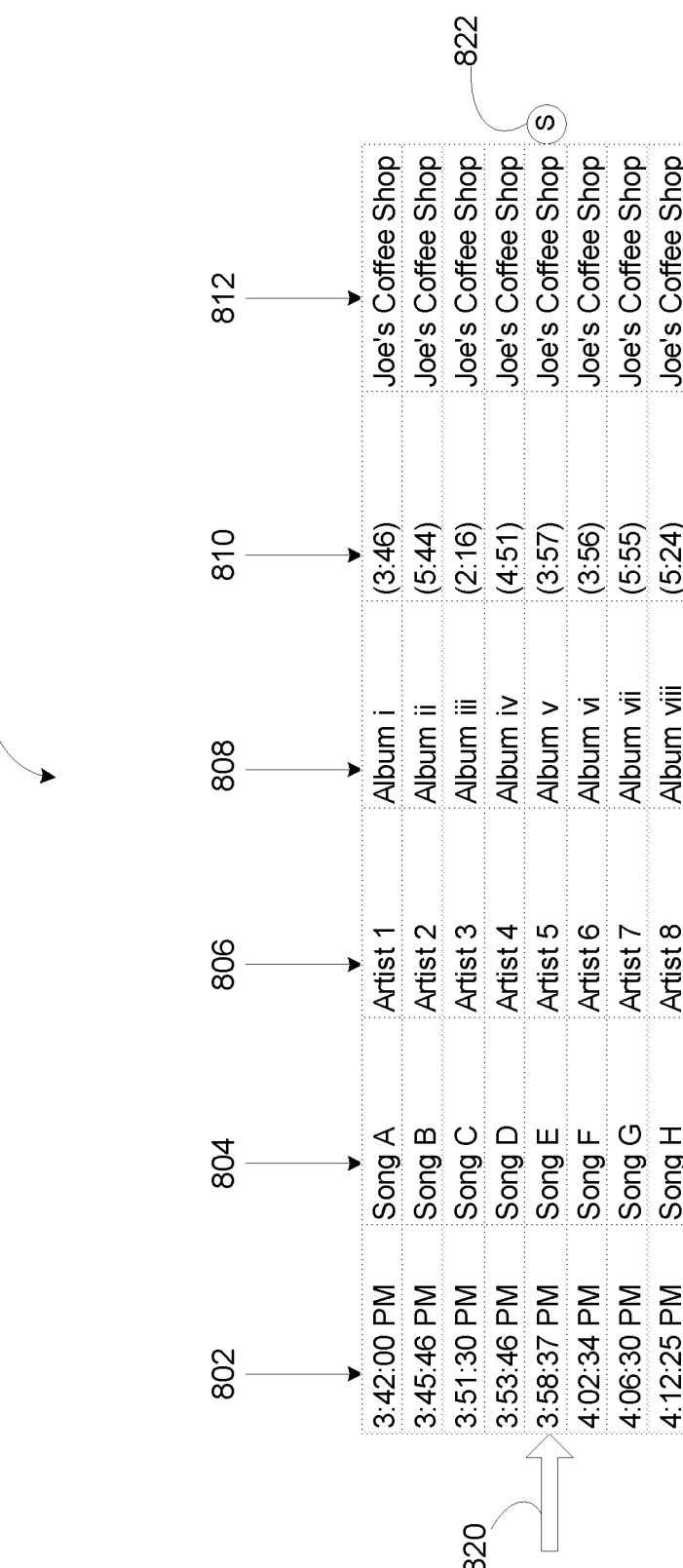
FIG. 8 shows an example display.

The identifying data may be received from a network-enabled playback device at the location (e.g. Joe's Coffee Shop) and the data may include at least one of: a title, a composer, an album title, a musical genre, a playback duration, a year of release, or a performer associated with the at least one portion of media content, among other examples. For example, rows of the display of FIG. 8 contain examples of such data pertaining to respective portions of media content. The data may identify the at least one portion of media content, the location where the at least one portion of media content was playing (e.g. via geolocation data or a descriptive identifier representing the location), and the particular time the at least one portion of media content was playing at the location. The data identifying the location may also identify a playback zone where the portion of media content played or may identify a media playback system that played the portion of media content (e.g. balcony area at Joe's Coffee Shop). In sum, the received data may include information such as "Play Time=3:42 pm, Content=Song A, Artist=Artist 1, Album Title=Album i, Track Duration=3: 46," as shown in FIG. 8, among other examples.

In some examples, the server may transmit, to a media playback device at the location, a request to provide the data identifying the at least one portion of media content. The server may transmit the request in response to receiving the indication that the user was at the location at the particular time. The media playback device may provide the data upon request. In another example, the server may periodically receive information regarding the at least one portion of media content from the media playback device, without previously receiving the indication that the user was at the location at the particular time. In this case, the server may identify the at least one portion of media content as playing at the location at the particular time minutes or even hours after receiving the information regarding the at least one portion of media content. Other examples are possible.

At block 606, the method includes transmitting data that indicates the identified at least one portion of media content to a computing device associated with the user. As an example, the server may transmit the playlist data 512D of FIG. 5 to the control device 506. The transmitted data may include, as an example, data included in one or more rows of the example display of FIG. 8. In FIG. 8, "Song E" may represent at least one portion of media content playing at the location at the particular time.

The server may transmit the data to the computing device from which the server originally received the "check-in" notification. As noted above, the user may have transmitted the "check-in" notification because the user wishes to later be provided with data identifying a portion of media content playing at the location. Alternatively, the server may transmit the data to an additional computing device associated with the user, such as a tablet computer configured to control a home media playback system associated with the user (which may be the same device as the device used to transmit the "check-in" notification), among other examples.

Before transmitting the data that indicates the identified at least one portion of media content, the server may first identify the media playback system associated with the user, perhaps by searching user-account information previously submitted by the user to the server. The server may then transmit the data that indicates the identified at least one portion of media content to the media playback system and/or the control device configured to control the media playback system.

The server may also transmit the data indicating the identified at least one portion of media content in response to receiving a request from the user (i.e. from a computing device associated with the user.) For example, the computing device may be running a media playback application and the device's touchscreen may display a virtual button titled "Geo-Queue" or "Check-In Related Playlists," among other examples. Upon touching or clicking this button, the device may send a request to the server to provide the data indicating the at least one portion of media content.

This block may also be performed by the server after receiving an indication that a computing device (e.g. associated with the user) is accessing a media playback system, and based on receiving the indication, transmitting the data indicating the at least one portion of media content to the computing device. For example, upon opening (i.e. executing) a media playback application on the computing device, the computing device may automatically transmit a request to the server to provide the data to the computing device.

In some embodiments, it may be useful for the user to receive information regarding more than the single portion of media content (i.e. the single song, movie clip, news, or talk radio segment) that was playing at the location at the particular time when the user (i.e. a computing device) provided the location message to the server. The method may therefore include the server identifying a plurality of portions of media content playing at the location during a time period that includes the particular time. This may include the server receiving, from a computing device associated with the user, data indicating the time period that includes the particular time, and identifying the plurality of portions of media content based on the data indicating the time period. Likewise, the server may transmit, perhaps to the computing device, the data that indicates the plurality of portions of media content playing at the location during the time period that includes the particular time.

For example, the user may use a computing device to transmit to the server a location message, similar to previously mentioned examples. For example, computing device 502 of FIG. 5 may transmit the location message 508A to the server 504. The computing device may later transmit an indication of a time period of interest, such as 3:42-4:20 PM on Mar. 11, 2014, or may transmit an indication of a generic time period that includes the particular time (i.e. a time period that spans from 20 minutes before and 20 minutes after the location message was transmitted by the computing device to the server). The server may receive, from a media playback system, a list of portions of media content that played at the location, and the server may determine which portions correspond to the received time period. Or, the server may provide the time period to a media playback system located at the location, and the media playback system may provide data representing only the portions of media content that correspond to the time period. Then, the server may transmit the data, to the user's computing device, indicating the plurality of portions of media content identified as playing at the location during the time period. In one example, the computing device may transmit an indication of the particular time (i.e. not a time period) and the server may nevertheless provide data indicating a plurality of portions of media content identified as playing at the location during a time period that includes the particular time.

FIG. 8 includes an example dataset, transmitted from the server to the computing device, that indicates a plurality of portions of media content playing at the location during the time period that includes the particular time. For example, a first row indicates a Song A that was played by a media playback system at the location during the time period, which may include 3:42:00 PM to 4:17:49 PM, as an example. According to the dataset, Song A began playing at 3:42:00 PM, is associated with "Artist 1" and an "Album i," has a duration of 3 minutes and 46 seconds, and was played at "Joe's Coffee Shop."

Method 700 shown in FIG. 7 presents an embodiment of a method that can be implemented within an operating environment involving, for example, the media playback system 100 of FIG. 1, one or more of the playback device 200 of FIG. 2, and one or more of the control device 300 of FIG. 3. Method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 700 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 700 and other processes and methods disclosed herein, each block in FIG. 7 may represent circuitry that is wired to perform the specific logical functions in the process.

At block 702, the method may include transmitting, by a control device configured to control a first playback device, an indication that a user was at a location at a particular time. As one example, in FIG. 5 the computing device 502 may transmit the location message 508A to the server 504. A user may use a control device (i.e. a computing device) such as a smartphone to transmit an indication in the form of a "check-in" message (i.e. a location message), to a server (i.e. a server device). The smartphone may transmit the indication in response to a user confirming a check-in location via a third party social networking application. The user may transmit the "check-in" message because the user wishes to later be provided with data identifying a portion of media content playing at the location. The social networking application may, for example, suggest check-in locations to the user via the computing device based on detecting a WIFI hotspot that the smartphone is connected to, or based on the smartphone's GPS-resolved location. By way of illustration, the indication may specify that the user was at "Joe's Coffee Shop" at 3:59 PM on Mar. 11, 2014. The server may receive the indication from the computing device over a wireless or wired network.

Block 702 may be functionally related to block 602 in other ways as well.

In the examples described above with regard to block 702, the user may have full control over whether and/or how the user's location history is used. In one example, the user's location information will only be collected or used to identify media content if the user explicitly expresses consent to such collection or use. In another example, the server may refrain from collecting information that could be used for personally identifying the user, and may only collect information that could be used to identify a user-account. Also, the user may be able to opt out of location data collection and use at any time.

At block 704, the method may include receiving, at the control device, data identifying at least one portion of media content played by a second playback device. As one example, the control device 506 of FIG. 5 may receive the playlist data 512D from the server 504. Further, some examples of data identifying at least one portion of media content are shown in FIG. 8. The at least one portion of media content may have been played by the second playback device at the location at the particular time when the user was at the location. The data may be received from a server.

Block 704 may also include receiving data identifying a plurality of portions of media content played during a time period that includes the particular time. In some embodiments, the data identifying the plurality of portions of media content played during the time period that includes the particular time indicates respective locations where the plurality of portions of media content were played. A user may provide the control device with an input indicating the time period (i.e. 4:00-6:00 PM on Mar. 11, 2014) and the control device may request that the server provide data corresponding to the user input. The control device may then receive the data from the server. In one example, the control device may transmit an indication of the particular time (i.e. not a time period) and the server may nevertheless provide data identifying a plurality of portions of media content played during the time period that includes the particular time.

Block 704 may be functionally related to block 606 in other ways as well. The nature of the received data is described in more detail in the description accompanying block 706 below.

At block 706, the method may include causing, by the control device, a graphical display to display the data identifying the at least one portion of media content played at the location at the particular time when the user was at the location. In some embodiments, this may include causing the graphical display to display the data identifying the plurality of portions of media content played during the time period that includes the particular time.

Although aspects of FIGS. 8-10 may apply to any of the blocks or embodiments disclosed herein, FIGS. 8-10 are generally related to block 706, as shown below. FIGS. 8-10 depict example displays of a graphical display of a control device that could result from performance of block 706.

FIG. 8 shows an example display 800 of the control device, in accordance with block 706 and other embodiments herein. In this example, the display includes a play time column 802, a content identifier column 804, an artist/performer column 806, an album title 808, a track duration column 810, and a location column 812. FIG. 8 also includes a portion identifier 820 and a streaming indicator 822.

Data displayed in FIG. 8 may generally represent data transmitted by media playback devices 510A-C of FIG. 5 (e.g. playlist data 512A-C), and data received by the control device 506 or media playback device 510D (e.g. playlist data 512D). In FIG. 8, "Song E" may represent at least one portion of media content playing at the location at the particular time.

The play time column 802 may contain data indicating when respective portions of media content began playing. The content identifier column 804 may indicate a title of the respective portions of media content. The artist/performer column 806 may indicate an artist or a performer associated with the respective portions of media content. The album title column 808 may indicate a title of an album associated with the respective portions of media content. The track duration column 810 may indicate a playback duration associated with the respective portions of media content. The location column 812 may indicate a location or a playback zone where the respective portions of media content were played.

The portion identifier 820 may indicate that the user "checked-in" or otherwise transmitted a location message to the server sometime between 3:58:37 PM and 4:02:33 PM, inclusive. The portion identifier 820 further indicates a specific portion of media content (i.e. Song E) that was played by a playback device at the location (i.e. Joe's Coffee Shop) at the particular time (i.e. sometime between 3:58:37 PM and 4:02:33 PM inclusive) that the user was at the location. In this embodiment, the display also includes information regarding portions of media content that played at the location during a time period that includes the particular time. The user may have used the control device to indicate, to the server, a time period of interest. This feature may be useful when the user causes the control device to transmit the location message before or after an interesting portion of media content was playing at the location. In this embodiment, the plurality of portions of media content may be displayed sorted in chronological order (i.e. portions played earlier in time placed at the top of the display). In other embodiments, the display may be sorted in reverse chronological order.

In some examples, the user may be able to click or touch the any of the displayed text corresponding to a particular portion of media content and the control device may display additional information about the portion, such as biographical information about the performer of the portion etc. If the user clicks the text again, the additional information may be removed from the display. In this way, the user may use input to toggle an amount of detail shown by the display.

Also, the streaming indicator 822 may convey that "Song E" is available for playback on the user's media playback system if the user were to subscribe to a particular music streaming service. Clicking the streaming indicator 822 may cause the control device to initiate a process of the user subscribing to the music streaming service. Other examples are possible.

FIG. 9 shows an example display 900 of the control device, in accordance with block 706 and other embodiments herein. FIG. 9 is similar to FIG. 8 but includes two portion identifiers 920A and 920B.

Data displayed in FIG. 9 may generally represent data transmitted by media playback devices 510A-C of FIG. 5 (e.g. playlist data 512A-C), and data received by the control device 506 or media playback device 510D (e.g. playlist data 512D).

The display 900 represents media content information pertaining to a situation where the user checked in at (i.e. sent location messages from) two different locations at two different times. Portion identifier 920A indicates that the user caused the control device to transmit a location message at "John's Tavern" sometime between 3:51:30 PM and 3:53:45 PM, inclusive. Portion identifier 920B indicates that the user (i.e. the user's control device) left John's Tavern and caused the control device to transmit a location message at "Joe's Coffee Shop" sometime between 4:02:34 PM and 4:06:29 PM, inclusive. The display indicates that Songs A-E were played at John's Tavern and Songs F-H were played at Joe's Coffee Shop. In this example, the displayed media content information is sorted in chronological order (i.e. portions played earlier in time placed at the top of the display). "Song C" and "Song F" may represent separate instances of at least one portion of media content that was playing at the location at the particular time.

In some embodiments, the control device may display information about portions of media content that were simultaneously playing at two different locations, based on the time period information provided by the user corresponding to the two (or more) location messages.

Data displayed in FIG. 10 may generally represent data transmitted by media playback devices 510A-C of FIG. 5

(e.g. playlist data 512A-C), and data received by the control device 506 or media playback device 510D (e.g. playlist data 512D).

FIG. 10 shows an example display 1000 of the control device, in accordance with block 706 and other embodiments described herein. Portion identifier 1020A indicates that the user caused the control device to transmit a location message at "Joe's Coffee Shop" sometime between 3:42:00 PM and 3:45:45 PM, inclusive. Portion identifier 1020B indicates that the user left Joe's Coffee Shop and caused the control device to transmit a location message at "John's Tavern" sometime between 3:51:30 PM and 3:53:45 PM, inclusive. Portion identifier 1020C indicates that the user went back to Joe's Coffee Shop and transmitted a location message sometime between 4:02:34 PM and 4:06:29 PM, inclusive. In this embodiment, the information about the plurality of portions of media content is sorted with respect to where the content was played. "Song A," "Song C," and "Song F" may represent separate instances of at least one portion of media content that was playing at the location at the particular time.

IV. Conclusion

The description above discloses, among other things, various example systems, methods, apparatus, and articles of manufacture including, among other components, firmware and/or software executed on hardware. It is understood that such examples are merely illustrative and should not be considered as limiting. For example, it is contemplated that any or all of the firmware, hardware, and/or software aspects or components can be embodied exclusively in hardware, exclusively in software, exclusively in firmware, or in any combination of hardware, software, and/or firmware. Accordingly, the examples provided are not the only way(s) to implement such systems, methods, apparatus, and/or articles of manufacture.

Embodiments described herein involve, among other things, providing from a server to a control device information regarding media content that was played by a media playback device while a user was at a location corresponding to the media playback device. The embodiments further involve, a control device displaying the information received from the server and providing a capability for a user to control another media playback device by, perhaps, causing the media playback device to play the media content that was played by the playback device while the user was at the corresponding location. Other aspects of the embodiments will be made apparent in the remainder of the description herein.

In one aspect, a method is provided. The method involves receiving an indication that a user was at a location at a particular time; identifying at least one portion of media content playing at the location at the particular time; and transmitting data that indicates the identified at least one portion of media content to a computing device associated with the user.

In another aspect, a computing device is provided. The computing device includes a processor and memory storing instructions that when executed by the computing device, cause the computing device to perform functions. The functions include receiving an indication that a user was at a location at a particular time; identifying at least one portion of media content playing at the location at the particular time; and transmitting data that indicates the identified at least one portion of media content to a computing device associated with the user.

In yet another aspect, a non-transitory computer readable memory is provided. The non-transitory computer readable memory has stored thereon instructions executable by a computing device to cause the computing device to perform functions. The functions include receiving an indication that a user was at a location at a particular time; identifying at least one portion of media content playing at the location at the particular time; and transmitting data that indicates the identified at least one portion of media content to a computing device associated with the user.

In another aspect, a method is provided. The method involves transmitting, by a control device configured to control a first playback device, an indication that a user was at a location at a particular time and receiving, at the control device, data identifying at least one portion of media content played by a second playback device. The at least one portion of media content was played by the second playback device at the location at the particular time when the user was at the location. The method further includes causing, by the control device, a graphical display to display the data identifying the at least one portion of media content played at the location at the particular time when the user was at the location.

In another aspect, a control device configured to control a first playback device is provided. The control device includes a processor and memory storing instructions that when executed by the control device, cause the device to perform functions. The functions include transmitting an indication that a user was at a location at a particular time and receiving data identifying at least one portion of media content played by a second playback device. The at least one portion of media content was played by the second playback device at the location at the particular time when the user was at the location. The method further includes causing a graphical display to display the data identifying the at least one portion of media content played at the location at the particular time when the user was at the location.

In yet another aspect, a non-transitory computer readable memory is provided. The non-transitory computer readable memory has stored thereon instructions executable by a computing device configured to control a first playback device to cause the computing device to perform functions. The functions include transmitting an indication that a user was at a location at a particular time and receiving data identifying at least one portion of media content played by a second playback device. The at least one portion of media content was played by the second playback device at the location at the particular time when the user was at the location. The method further includes causing a graphical display to display the data identifying the at least one portion of media content played at the location at the particular time when the user was at the location.

Additionally, references herein to "embodiment" means that a particular feature, structure, or characteristic described in connection with the embodiment can be included in at least one example embodiment of an invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

The specification is presented largely in terms of illustrative environments, systems, procedures, steps, logic blocks, processing, and other symbolic representations that directly or indirectly resemble the operations of data processing devices coupled to networks. These process descriptions and representations are typically used by those skilled in the art to most effectively convey the substance of their work to others skilled in the art. Numerous specific details are set forth to provide a thorough understanding of the present disclosure. However, it is understood to those skilled in the art that certain embodiments of the present disclosure can be practiced without certain, specific details. In other instances, well known methods, procedures, components, and circuitry have not been described in detail to avoid unnecessarily obscuring aspects of the embodiments. Accordingly, the scope of the present disclosure is defined by the appended claims rather than the forgoing description of embodiments.

When any of the appended claims are read to cover a purely software and/or firmware implementation, at least one of the elements in at least one example is hereby expressly defined to include a tangible, non-transitory medium such as a memory, DVD, CD, Blu-ray, and so on, storing the software and/or firmware.

The invention claimed is:

1. A computing system comprising:
at least one network interface;
at least one processor; and
at least one non-transitory computer-readable medium comprising program instructions that are executable by the at least one processor such that the computing system is configured to:
receive, from a mobile device via the at least one network interface, first network data corresponding to a first network to which the mobile device is connected;
identify one or more first media items at least partially played back by one or more first playback devices connected to the first network while the mobile device was connected to the first network;
identify a media playback system associated with the mobile device, wherein the media playback system comprises one or more second playback devices connected to a second network different than the first network;
transmit, via the at least one network interface and to at least one device associated with the media playback system, playback data representing the one or more first media items at least partially played back by the one or more first playback devices while the mobile device was connected to the first network; and
cause the at least one device associated with the media playback system to provide a selectable indication corresponding to the one or more first media items, wherein the selectable indication, when selected, causes the one or more second playback devices to play back at least part of the one or more first media items.

2. The computing system of claim 1, wherein the at least one device associated with the media playback system comprises one or more of: the mobile device, one or more of the one or more second playback devices, or another device.

3. The computing system of claim 1, wherein the mobile device is associated with a user account, and the media playback system is associated with the user account.

4. The computing system of claim 3, wherein the at least one device associated with the media playback system comprises a device associated with the user account.

5. The computing system of claim 4, wherein the at least one device is different from the mobile device and the one or more second playback devices.

6. The computing system of claim 1, wherein the at least one non-transitory computer-readable medium further comprises program instructions such that the computing system is configured to:
receive, from the mobile device via the at least one network interface, second network data corresponding to a third network to which the mobile device is connected;
identify one or more second media items at least partially played back by one or more third playback devices connected to the third network while the mobile device was connected to the third network; and
transmit, via the at least one network interface and to the at least one device associated with the media playback system, second playback data representing the one or more second media items at least partially played back by the one or more third playback devices while the mobile device was connected to the third network.

7. The computing system of claim 6, wherein the at least one non-transitory computer-readable medium further comprises program instructions such that the computing system is configured to:
cause the at least one device associated with the media playback system to provide an additional selectable indication corresponding to the one or more second media items, wherein the additional selectable indication, when selected, causes the one or more second playback devices to play back at least part of the one or more second media items, and wherein the additional selectable indication is separate and distinct from the selectable indication.

8. The computing system of claim 6, wherein the at least one non-transitory computer-readable medium further comprises program instructions such that the computing system is configured to:
generate a location-based playlist that includes at least one first media item of the one or more first media items and at least one second media item of the one or more second media items.

9. The computing system of claim 8, wherein the program instructions that are executable by the at least one processor such that computing system is configured to transmit the playback data representing the one or more first media items comprise program instructions that are executable by the at least one processor such that the computing system is configured to transmit first data corresponding to the location-based playlist, and wherein the program instructions that are executable by the at least one processor such that computing system is configured to transmit the second playback data representing the one or more second media items comprise program instructions that are executable by the at least one processor such that the computing system is configured to transmit second data corresponding to the location-based playlist.

10. The computing system of claim 1, wherein the program instructions that are executable by the at least one processor such that computing system is configured to transmit the playback data representing the one or more first media items comprise program instructions that are executable by the at least one processor such that the computing system is configured to transmit the playback data representing the one or more first media items to the at least one device associated with the media playback system after receiving a request from the at least one device.

11. A non-transitory computer-readable medium having stored thereon instructions executable by one or more processors to cause a computing system to perform functions comprising:

receiving, from a mobile device via at least one network interface of the computing system, first network data corresponding to a first network to which the mobile device is connected;

identifying one or more first media items at least partially played back by one or more first playback devices connected to the first network while the mobile device was connected to the first network;

identifying a media playback system associated with the mobile device, wherein the media playback system comprises one or more second playback devices connected to a second network different than the first network;

transmitting, via the at least one network interface and to at least one device associated with the media playback system, playback data representing the one or more first media items at least partially played back by the one or more first playback devices while the mobile device was connected to the first network; and causing the at least one device associated with the media playback system to provide a selectable indication corresponding to the one or more first media items, wherein the selectable indication, when selected, causes the one or more second playback devices to play back at least part of the one or more first media items.

12. The non-transitory computer-readable medium of claim 11, wherein the at least one device associated with the media playback system comprises one or more of: the mobile device, one or more of the one or more second playback devices, or another device.

13. The non-transitory computer-readable medium of claim 11, wherein the mobile device is associated with a user account, and the media playback system is associated with the user account.

14. The non-transitory computer-readable medium of claim 13, wherein the at least one device associated with the media playback system comprises a device associated with the user account.

15. The non-transitory computer-readable medium of claim 14, wherein the at least one device is different from the mobile device and the one or more second playback devices.

16. The non-transitory computer-readable medium of claim 11, further having stored thereon instructions executable by the one or more processors to cause the computing system to perform functions comprising:

receiving, from the mobile device via the at least one network interface, second network data corresponding to a third network to which the mobile device is connected;

identifying one or more second media items at least partially played back by one or more third playback devices connected to the third network while the mobile device was connected to the third network; and transmitting, via the at least one network interface and to the at least one device associated with the media playback system, second playback data representing the one or more second media items at least partially played back by the one or more third playback devices while the mobile device was connected to the third network.

17. The non-transitory computer-readable medium of claim 16, further having stored thereon instructions executable by the one or more processors to cause the computing system to perform functions comprising:

causing the at least one device associated with the media playback system to provide an additional selectable indication corresponding to the one or more second media items, wherein the additional selectable indication, when selected, causes the one or more second playback devices to play back at least part of the one or more second media items, and wherein the additional selectable indication is separate and distinct from the selectable indication.

18. The non-transitory computer-readable medium of claim 16, further having stored thereon instructions executable by the one or more processors to cause the computing system to perform functions comprising:

generating a location-based playlist that includes at least one first media item of the one or more first media items and at least one second media item of the one or more second media items.

19. The non-transitory computer-readable medium of claim 18, wherein transmitting the playback data representing the one or more first media items comprises transmitting first data corresponding to the location-based playlist, and wherein transmitting the second playback data representing the one or more second media items comprises transmitting second data corresponding to the location-based playlist.

20. A method to be performed by a computing system, the method comprising:

receiving, from a mobile device via at least one network interface of the computing system, first network data corresponding to a first network to which the mobile device is connected;

identifying one or more first media items at least partially played back by one or more first playback devices connected to the first network while the mobile device was connected to the first network;

identifying a media playback system associated with the mobile device, wherein the media playback system comprises one or more second playback devices connected to a second network different than the first network;

transmitting, via the at least one network interface and to at least one device associated with the media playback system, playback data representing the one or more first media items at least partially played back by the one or more first playback devices while the mobile device was connected to the first network; and causing the at least one device associated with the media playback system to provide a selectable indication corresponding to the one or more first media items, wherein the selectable indication, when selected, causes the one or more second playback devices to play back at least part of the one or more first media items.

\* \* \* \* \*